Feb. 17, 1953     L. H. SANDEFUR     2,628,493
MEANS FOR CALIBRATING LIQUID LEVEL MEASURING STICKS
Filed April 3, 1950     2 SHEETS—SHEET 1
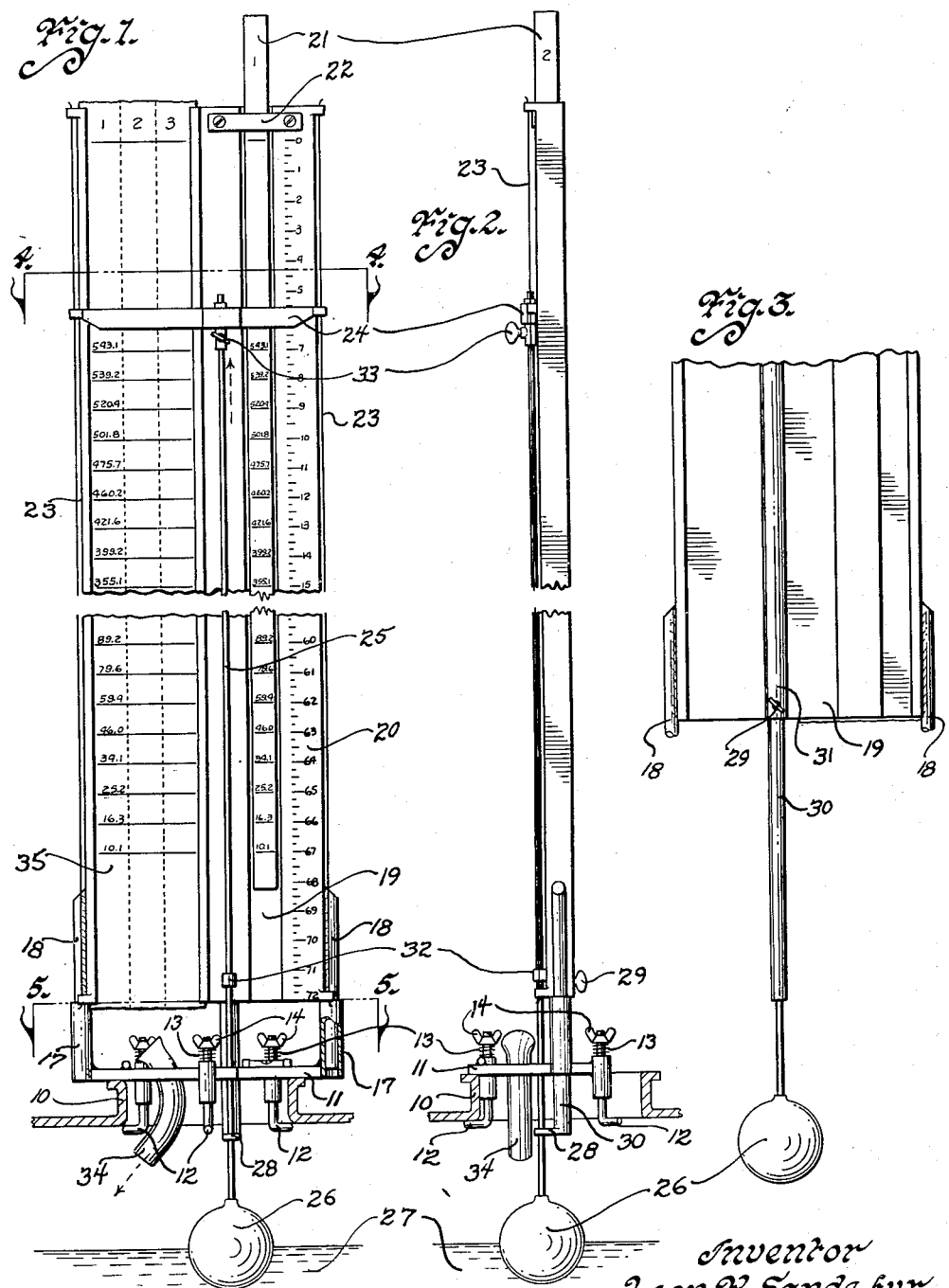
Inventor
Leon H. Sandefur
by M. Talbert Dick
Attorney
Witness
Edward P. Seeley Feb. 17, 1953 L. H. SANDEFUR 2,628,493
MEANS FOR CALIBRATING LIQUID LEVEL MEASURING STICKS
Filed April 3, 1950 2 SHEETS—SHEET 2
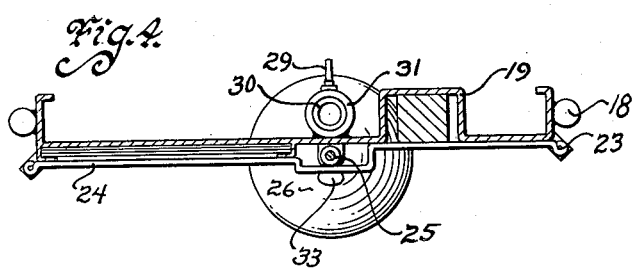
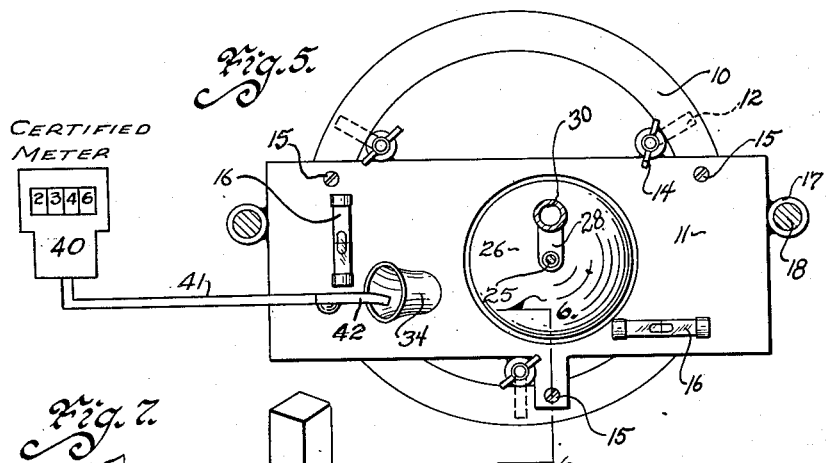
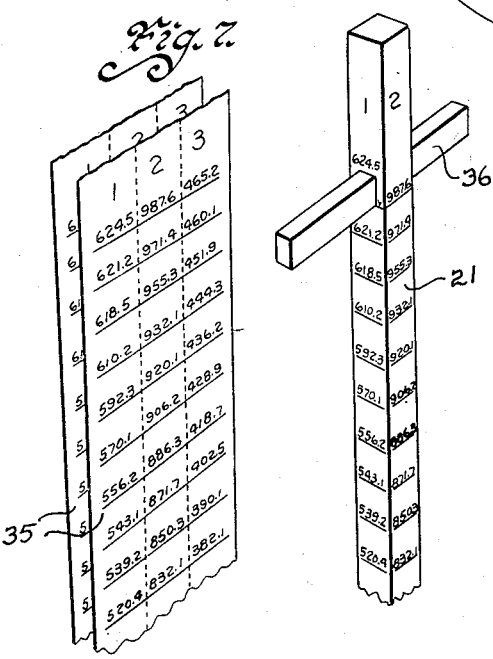
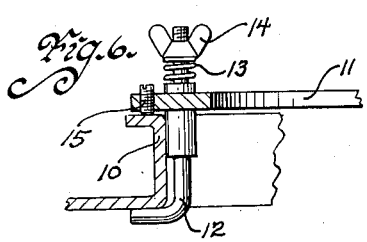
Inventor
Leon H. Sandefur
by M. Talbert Dick
Attorney
Witness
Edward P. Seeley Patented Feb. 17, 1953

2,628,493

UNITED STATES PATENT OFFICE 2,628,493

MEANS FOR CALIBRATING LIQUID LEVEL MEASURING STICKS

Leon H. Sandefur, Des Moines, Iowa

Application April 3, 1950, Serial No. 153,649

4 Claims. (Cl. 73—1)

My invention relates to the art of calibrating immersion type liquid level measuring sticks for determining the amount of liquid contents of a liquid storing tank. Specifically I have invented a means for calibrating such liquid level measuring sticks that permits the work to be accomplished without immersing the stick in the fluid or inserting the stick into the tank at all during the calibrating procedure.

In the art of providing a liquid level measuring stick of the type that is inserted into a tank to determine the amount of liquid in the tank, and that is commonly known as a dip stick, the process of marking these sticks has been a tedious one. In spite of the labor and therefore expense involved, however, the work is done since the usual liquid volume meters are subject to error and failure. An illustrative example of the procedure heretofore as compared to that of my invention is the calibrating of the dip sticks for use with petroleum products transports. These trucks and trailers are made up of a series of tanks mounted side by side on a single chassis. Each tank has an access dome on top. When it is desired to calibrate a dip stick for a particular tank, the dome cover is opened and a precision volume measuring meter is used to insert a known quantity of fluid into the tank. The dip stick being prepared for this tank is then inserted to the bottom of the tank as a point of reference. When the stick is wet with the liquid, it is rapidly withdrawn and marked to indicate the quantity of liquid that was inserted to wet the stick to that point. These steps are repeated until the stick is completely calibrated. Of course, much time is lost in removing the stick and replacing it, and the evil is multiplied by the number of tanks on any given vehicle because no two tanks are near enough alike to permit using the same stick for both. Furthermore, the numerous possibilities for error in this method of calibrating sticks requires the employment of highly trained, skilled workmen to carry out the work. Even the most skillful and careful workers, however, are apt to make errors as the slightest splash or ripple might cause an error in a reading of a number of gallons. Additionally, considerable time was consumed in carrying out the process by the old method. I have developed and perfected, therefore, a method and a device for effecting it that eliminates or minimizes many of the difficulties heretofore existing in this field of endeavor.

It is the principal object of my invention to provide a device for calibrating dip sticks that can be executed while the stick to be calibrated is retained outside the tank for which it is being prepared. Another object of my invention is to provide a device for effecting the calibration of dip sticks that may be used effectively by relatively unskilled workmen.

These and other objects will be apparent to those skilled in the art.

My invention consists in the device for executing the work to be done as described in the specification and illustrated in the accompanying drawing in which:

Fig. 1 is a front view of my device with a portion broken away to more fully illustrate the means for securing the frame to the base. The center section is cut away to save space, and a tank dome is shown in cross-section.

Fig. 2 is a side view of my device with a tank dome shown in cross-section. The center section is broken out to save space.

Fig. 3 is a rear view of the lower portion of the frame and float and illustrates the vertically adjustable character of the lower float rod guide.

Fig. 4 is a cross-sectional view taken on the line 4—4 of Fig. 1 but with the base platform not shown.

Fig. 5 is a cross-sectional view of my device taken on the line 5—5 of Fig. 1. A legend representing a certified volume measuring meter is also shown.

Fig. 6 is a detail of the base platform securing and leveling means shown in cross-section and taken on the line 6—6 of Fig. 5.

Fig. 7 is a perspective view of the recording tape and finished dip stick complete with tank top engaging cross bar.

Referring to the drawings the numeral 10 identifies the top of a petroleum products transport tank on which the base platform 11 of my device is resting. The clamps 12 extend through the platform base 11 at three points and are yieldingly urged upwardly by springs 13 pushing upwardly on wing nuts 14 from platform base 11. Adjacent to each of these clamps that tend to hold the platform base down on the top of the tank, is a leveling screw 15 which may be used in conjunction with the levels 16 to set the platform in the proper operating position. Sockets 17 slidably receive legs 18 to support frame 19 in a vertical position in respect to platform base 11. A reference scale 20 extends down one side of the frame with an indentation extending parallel and adjacent to the reference scale and offering a recess to receive dip stick 21 which is held in place by any suitable means as by clamp 22 or the like. The markings and numbers on the reference scale are purely arbitrary since the scale is merely for the purpose of indicating a series of equally spaced positions to which the float is raised by inserting liquid into the tank. If liquid is inserted by fixed increments, the scale may be disregarded altogether. The dip stick will be more artistic in appearance, however, if the recordings are marked at regularly spaced intervals as will be the case whe the reference scale is used. Two guide members 23 flank the frame to guide cross bar 24 as it is moved by rod 25 connecting it to float 26 that is supported by the liquid 27 which is used for the calibration run. Collar 28 is one aligning member for rod 25 and is manually adjustable to avoid strain on rod 25 when it is in a lowered position. Thumb screw 29 fixes the position of this collar by securing shaft 30 in tube 31. Fixed collar 32 cooperates with collar 28 to guide the rod in a vertical path. It will be noted from a reference to Figs. 1 and 2 that cross bar 24 is vertically adjustable on rod 25 by loosening thumb screw 33 and manually sliding the cross bar with respect to the rod. Nozzle 34 is used to receive liquid placed in the tank during the calibrating process and guides it away from the float so as to reduce the disturbance of readings given by the float and appended equipment.

The numeral 40 designates a certified liquid volume measuring meter which is connected to nozzle 34 by means of any appropriate conduit such as the one designated 41 having a suitable flow control valve 42 adjacent to nozzle 34. This meter measures the calibrating liquid entering the tank through nozzle 34 and is connected to any suitable source of such liquid which is not shown. A recording tape 35 in duplicate extends up the side of the frame opposite to that on which the reference scale is located and is here shown illustratively with three columns each representing a different set of calibrations on a given side of the stick for one of this particular set of tanks. The position of the tape, reference scale, and stick to be calibrated as well as the number of tanks recorded on one stick and tape is purely for the sake of example, of course, since hexagonal or even octagonal sticks are sometimes used with similar increase in the number of columns on the recording tape. The stick tank top engaging bar 36 is inserted after the stick is calibrated. It is a point of reference for the stick from the top of the tank downwardly.

The process of calibrating a dip stick using my device for executing it is as follows: Base platform 11 with frame 19 in place is rested on a small receptacle such as an ordinary pail or the like that is filled with the liquid to be used in the calibration run, usually water. As shown in Figs. 1 and 2, the float will displace sufficient of a given liquid to cause itself and elements 24 and 25 to be supported with a fixed amount of float 26 above the liquid level. The liquid in a filled pail, therefore, will cause float 26 to assume the same position it would in a large tank filled with the same liquid. The float will be at its highest possible point under these conditions and cross bar 24 may be adjusted to zero on the reference scale by loosening thumb screw 33 and making a manual sliding adjustment of rod 25 and cross bar 24. The dip stick is then clamped in place and a mark is made on it at a point on a level with zero at the top of the reference scale. This point represents the top of the tank for which the stick is being calibrated.

The device is now set for use, a recording tape and duplicate are inserted, and the platform base is placed on top of the empty tank. Clamps 12 are inserted under the edge of the tank top and wing nuts 14 are tightened. Since three points determine a plane, the leveling screws 15 may be adjusted until levels 16 show the platform base is horizontal. The legs 18 of frame 19 are then inserted in sockets 17 and the whole device is ready for the calibration run. The adjustable rod collar guide is lowered and through a certified volume measuring meter and directing nozzle 34 liquid is introduced into the tank until the float and rod 25 moves cross bar 24 to a given point on the reference scale. This point will vary depending on the location of the float when the test is started that will depend in turn on the depth of the tank (up to the limits of the device). Using the cross bar to gage the place, this point to which the liquid has raised the float is recorded on the stick and the tape. A figure given by the certified meter will indicate the number of gallons or other units of volume inserted into the tank to raise the float so far and this figure is recorded on the tape. These steps of inserting fluid to a measured level and recording them on tape and stick is repeated until the whole tank has been calibrated. The process is repeated for each tank on the unit being tested. The tape recordings are valuable in the event the stick is damaged or lost and to permit the actual marking of the amounts on the stick at a more propitious time and circumstances.

It can be seen very easily that there is no need to insert the stick in the tank and that the whole procedure may be run as a more or less continuous process. The mechanism requires some awareness of the results desired on the part of the workmen using it, but it is also clear that nearly anyone of normal intelligence could be trained to make accurate calibrations of dip sticks. The method formerly used and discussed above requires technicians of considerable skill and ability, however. My device in the hands of those reasonably well acquainted with the manner of using it will reduce the time required to calibrate a set of sticks (actually several sides of one stick) to about one-third of that required by highly trained workers using the old method. My method is, furthermore, much more accurate than the old method.

Some changes may be made in the construction and arrangement of my method and means for calibrating liquid level measuring sticks without departing from the real spirit and purpose of my invention, and it is my intention to cover by my claims, any modified forms of structure or use of mechanical equivalents which may be reasonably included within their scope.

I claim:

1. In a dip stick calibrating device adapted to being used on a tank having a top opening, a frame adapted to being detachably secured in a vertical position on the top opening of a tank, a rod movably mounted on said frame to be vertically slidable thereon, a float secured to the lower end of said rod, a cross bar secured to said rod at right angles thereto, a reference scale comprising a plurality of evenly spaced marks arranged vertically on said frame, a means for clamping a dip stick in a vertical position on said frame, and means for introducing measured quantities of liquid into a tank through a tank top opening on which said frame is secured; said cross member extending across the portion of said frame to which a dip stick is clamped and across said reference scale; said rod and float adapted to enter said tank and to extend near the bottom thereof; said float and rod adapted to move slidably upwardly in response to a rising liquid level.

2. In a dip stick calibrating device adapted to being used on a tank having a top opening, a frame adapted to being detachably secured in a vertical position on the top opening of a tank, a rod movably mounted on said frame to be vertically slidable thereon, a float secured to the lower end of said rod, a cross bar secured to said rod at right angles thereto, a means for clamping a dip stick in a vertical position on said frame, and means for introducing measured quantities of liquid into a tank through a tank top opening on which said frame is secured; said cross member extending across the portion of said frame to which a dip stick is clamped; said rod and float adapted to enter said tank and to extend near the bottom thereof; said float and rod adapted to move slidably upwardly in response to a rising liquid level.

3. In a dip stick calibrating device adapted for use with a volume measuring device and a tank, a frame adapted to being secured in a vertical position to the top of a tank, a rod vertically slidably secured to said frame, a float secured to the lower end of said rod, a cross bar secured near the upper end of said rod, a reference scale secured to said frame in a vertical position, a means for securing a dip stick on said frame in a vertical position parallel to said reference scale, and a nozzle on said frame for directing liquids entering said tank through said nozzle away from said float; said rod and float adapted to enter said tank and to extend near the bottom thereof; said float and rod adapted to move slidably upwardly in response to a rising liquid level.

4. In a dip stick calibrating device adapted for use on tanks having a top opening, a frame base adapted to being secured to a tank top opening, a means on said frame base for adjusting it to a level horizontal position on a tank top opening, a pair of sockets on said frame base, a frame member having elements thereon that slidably engage said sockets to hold said frame member in a vertical position relative to said frame base, a rod member vertically slidably mounted on said frame member and extending below said frame base when said frame member is mounted on said frame base, a float on the lower end of said rod, a cross secured at right angles to said rod near its top, a plurality of evenly and vertically spaced marks forming a vertically extending reference scale on said frame member, a means for securing a dip stick in a position parallel to said reference scale, and a nozzle means for conducting liquid past said base member and away from said float member.

LEON H. SANDEFUR.

REFERENCES CITED

The following references are of record in the file of this patent:

UNITED STATES PATENTS

| Number | Name | Date |
| --- | --- | --- |
| 191,971 | Johnston | June 12, 1877 |
| 206,259 | Prime | July 23, 1878 |
| 684,850 | Nafis | Oct. 22, 1901 |
| 1,019,442 | Edmonds et al. | Mar. 5, 1912 |
| 1,394,423 | Mazzi et al. | Oct. 18, 1821 |
| 1,908,196 | Talbot | May 9, 1933 |